(12) United States Patent
Yeung et al.

(10) Patent No.: US 7,471,820 B2
(45) Date of Patent: Dec. 30, 2008

(54) CORRECTION METHOD FOR DEFECTS IN IMAGERS

(75) Inventors: Clifford Yeung, San Jose, CA (US); Sachin Datar, Boise, ID (US)

(73) Assignee: Aptina Imaging Corporation, Grand Cayman (KY)

( * ) Notice: Subject to any disclaimer, the term of this patent is extended or adjusted under 35 U.S.C. 154(b) by 450 days.

(21) Appl. No.: 11/209,775

(22) Filed: Aug. 24, 2005

(65) Prior Publication Data
US 2006/0044425 A1 Mar. 2, 2006

Related U.S. Application Data

(60) Provisional application No. 60/605,520, filed on Aug. 31, 2004.

(51) Int. Cl.
*G06K 9/00* (2006.01)
*H04N 9/64* (2006.01)

(52) U.S. Cl. ........................................ 382/149; 382/246

(58) Field of Classification Search ................. 382/147, 382/149, 254, 260, 261, 270, 272, 274, 275, 382/300, 305, 312; 348/246, 241, 247, 248–252; 348/272, 607, 610; 359/292; 250/559.4, 250/559.06; 358/525, 528, 441, 451; 430/22, 430/311
See application file for complete search history.

(56) References Cited

U.S. PATENT DOCUMENTS

| | | | |
|---|---|---|---|
| 6,650,789 B2 | 11/2003 | Edgar et al. | |
| 6,683,995 B2 | 1/2004 | Ford et al. | |
| 6,711,302 B1 | 3/2004 | Lee | |
| 6,747,697 B1 * | 6/2004 | Lin et al. | 348/246 |
| 6,806,902 B1 | 10/2004 | Donovan | |
| 6,813,062 B2 * | 11/2004 | Sandstrom | 359/292 |
| 7,054,507 B1 * | 5/2006 | Bradley et al. | 382/300 |
| 2001/0052938 A1 | 12/2001 | Itoh | |
| 2003/0138160 A1 * | 7/2003 | Ishikawa | 382/260 |
| 2003/0179418 A1 | 9/2003 | Wengender et al. | |
| 2004/0169746 A1 * | 9/2004 | Chen et al. | 348/246 |

OTHER PUBLICATIONS

Johnathon Fewkes et.al., Enhance picture quality using advanced camera system, Micron Technology, Inc., published Apr. 18, 2005.

* cited by examiner

*Primary Examiner*—Kanji Patel
(74) *Attorney, Agent, or Firm*—Dickstein Shapiro LLP

(57) ABSTRACT

A method and apparatus that allows for the identification and correction of defective pixels and/or pixel clusters in an imaging device. The method, and implementing apparatus determines that a pixel is defective based upon a comparison of its pixel signal value with the value of neighboring pixels. In one exemplary embodiment, a pixel is defective if it is beyond a pre-determined threshold of either a high or low value from its neighboring, corrected pixels. Pixels identified as defective can be corrected using exemplary methods of the invention such as substituting a value of the defective pixel with a value of one of its non-defective neighbors.

45 Claims, 8 Drawing Sheets

CORRECTION METHOD FOR DEFECTS IN IMAGERS

This application claims benefit of application Ser. No. 60/605,520 filed Aug. 31, 2004.

FIELD OF THE INVENTION

The invention relates generally to the field of solid state imager devices, and more particularly to methods of identifying and correcting pixel defects in a solid state imager device.

BACKGROUND OF THE INVENTION

Solid state imagers, including charge coupled devices (CCD) and CMOS imagers, have been used in photo imaging applications. A solid state imager circuit includes a focal plane array of pixel cells, each one of the cells including a photosensor, which may be a photogate, photoconductor or a photodiode having a doped region for accumulating photo-generated charge.

During the manufacture of solid state imagers, the creation of defective pixels is unavoidable. These defective pixels, if not corrected, can cause severe degradation of image quality and, as a result, decrease the yield of parts during production. Thus, minimization of these defects during fabrication will yield a higher quality product. However, it is usually less expensive to make a device (e.g., semiconductor imager device) using less precise manufacturing tolerances. Devices that are produced using less precise manufacturing tolerances, on the other hand, have a higher probability of defects. Typical semiconductor fabrication rules define some tradeoff between the quality (i.e., lack of defects) and cost of manufacture. The manufactured semiconductor devices are tested for defects, and any semiconductor device having more than a certain number of defects is usually discarded.

Image acquisition semiconductor devices are sensitive to defects and a sensor with defects may not yield aesthetically pleasing images. It is especially evident when defects are located in low frequency areas or at edges. An edge in images are areas with strong intensity contrasts. A bad pixel in an image acquisition semiconductor device will show up as a bad area on the acquired image. The defective pixels may not work at all or, alternatively, they may be significantly brighter or dimmer than expected for a given light intensity. Depending on the desired quality and the intended application, a single defective pixel may sometimes be sufficient to cause the device containing the pixel to be discarded.

In most instances, however, a small percentage of defective pixels can be tolerated and compensated for. Numerous techniques exist for locating and correcting single defective pixels in an image acquisition semiconductor device.

One simple technique for correcting single defective pixels involves taking a signal from each pixel in an array and storing the pixel signal values in memory. During image processing, the saved value for a defective pixel can be replaced by the calculated signal value of the neighboring pixels of the defective pixel. These simple methods, however, are not viable for all pixel defects, such as, for example, those suffering from excessive dark current. Other more complicated methods have been devised to correct single defective pixels, including dark current pixels. For example, see the method discussed in the paper submitted by B. Dierickx and G. Meyanants "Missing Correction Method for Image Sensors," submitted for Europto-SPIE/AFPAEC May 18-21, 1998.

Correction of multiple defective pixels in a small area of an array, termed "cluster defects" or "defective pixel clusters," however, still remains a significant challenge. Accordingly, there is a need and desire for a method capable of correcting defective pixel clusters to improve the yield of imager manufacturing.

BRIEF SUMMARY OF THE INVENTION

The invention, in various exemplary embodiments, relates to a method and apparatus that allows for the identification and correction of single defective pixels and/or defective pixel clusters in an imaging device pixel array.

In accordance with embodiments of the invention, the method and implementing apparatus determines that a pixel is defective based upon a comparison of its pixel signal value (or a digitized version thereof) with the values of neighboring pixels in a correction kernel for the pixel being considered. In one exemplary embodiment, a pixel is defective if its value is beyond a threshold of either the maximum or minimum of corrected neighboring pixels.

In addition, pixels identified as defective can be corrected using exemplary methods of the invention by substituting a value of the defective pixel with a value obtained from one of its non-defective neighbors.

BRIEF DESCRIPTION OF THE DRAWINGS

The foregoing and other advantages and features of the invention will be more readily understood from the following detailed description of the invention provided below with reference to the accompanying drawings, in which.

DETAILED DESCRIPTION OF THE INVENTION

In the following detailed description, reference is made to the accompanying drawings, which form a part hereof and show by way of illustration specific embodiments in which the invention may be practiced. These embodiments are described in sufficient detail to enable those skilled in the art to practice the invention, and it is to be understood that other embodiments may be utilized, and that structural, logical, and electrical changes may be made without departing from the spirit and scope of the present invention. The progression of processing steps described is exemplary of embodiments of the invention; however, the sequence of steps is not limited to that set forth herein and may be changed as is known in the art, with the exception of steps necessarily occurring in a certain order.

The term "pixel," as used herein, refers to a photo-element unit cell containing a photosensor device and associated structures for converting photons to an electrical signal. For purposes of illustration, a single representative three-color pixel array is illustrated in the figures and description herein.

However, the invention may be applied to monochromatic imagers as well as to imagers for sensing fewer than three or more than three color components in an array. Accordingly, the following detailed description is not to be taken in a limiting sense, and the scope of the present invention is defined only by the appended claims.

Figure 1:
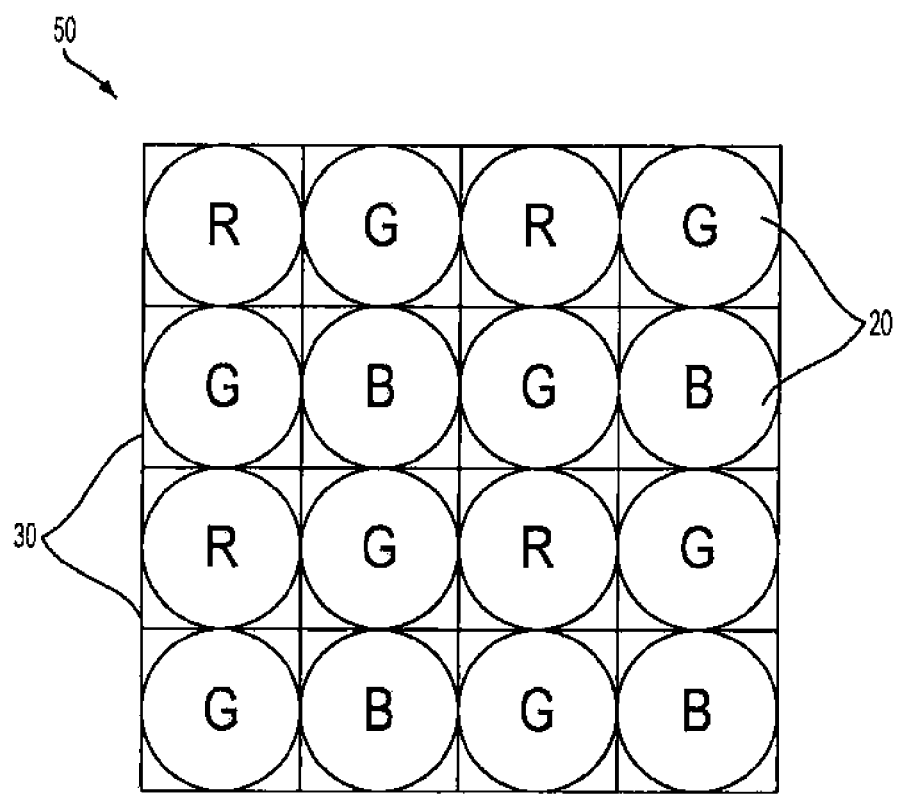
FIG. 1 is a top-down view of a conventional microlens and color filter array used in connection with a pixel array.

In addition, it should be understood that, taken alone, a pixel generally does not distinguish one incoming color of light from another, and in fact, its output signal represents only the intensity of light received, not any identification of color. However, pixels 30, as illustrated in FIG. 1 and discussed herein, are referred to by color (i.e., "red pixel," "blue pixel," etc.) when a color filter 20 is used in connection with the pixel 30 to focus a particular wavelength range of light, corresponding to a particular color, onto the pixel 30. FIG. 1 depicts a conventional color filter array, arranged in a Bayer pattern, used to transmit incoming light onto a pixel array 50. Accordingly, when the term "red pixel" is used herein, it is referring to a pixel associated with a red color filter. Filters of other colors similarly filter wavelength ranges corresponding to the color to which they refer.

For the reasons discussed above, attention has been devoted to early detection and correction of pixel defects. Known methods exist for handling individual pixel defects. However, very few defect correction methods account for cluster defects. Although most method remain a viable option for fixing single pixel defects, their assumptions will likely break down when cluster defects exist and leave defects uncorrected.

A simple example of correction starts with an imaging circuit for image processing, such as an image processor 280 (FIG. 6), which is provided with or determines a location of a defective pixel. The defect may be identified by the imaging circuit comparing each pixel signal to those of neighboring pixels and recognizing that one pixel has a value that is significantly out-of-range in comparison. For example, for a group of pixels in an area, if the minimum or maximum signal is much lower or higher, respectively, than the other pixels, the image processor 280 recognizes this mistake and assigns that defective pixel the average value of neighboring pixels of the same color. This method does not work on pixel clusters, which can be defined as two or more defective pixels of the same color within a three-by-three grid of pixels in an array. This defect correction does not work on cluster defects because with a defect cluster, one of the neighboring pixels also has a defective value, and therefore, not all neighboring pixel values can be used for comparison and substitution.

The present invention, as described in more detail below, relates to an on-the-fly method for detecting and correcting individual and/or cluster defects. In accordance with the exemplary embodiments of the invention, a defect correction method is performed, preferably by a correction circuit in a color signal processing pipeline, to correct cluster defects. It should be noted that other defect corrections may be performed in conjunction with the exemplary method, for example, to correct single pixel defects as described above.

Figure 2A:
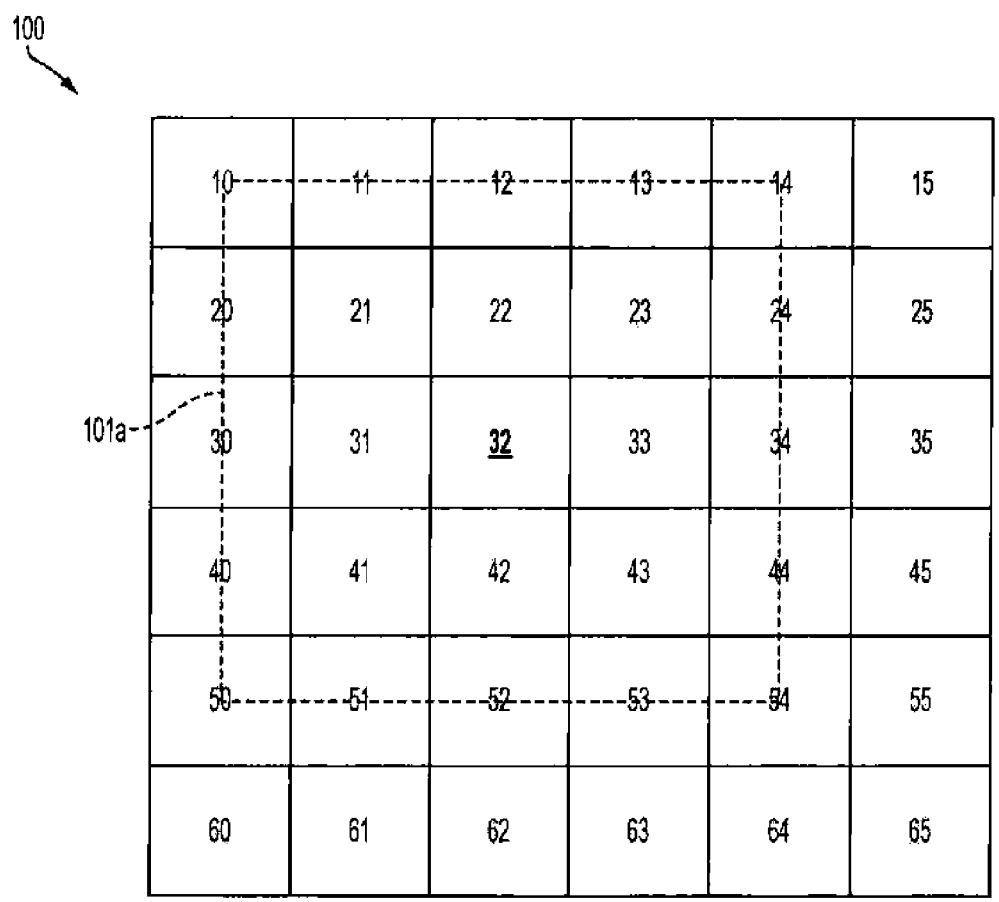
FIG. 2A depicts a correction kernel for a defective red or blue pixel of a pixel array in accordance with the invention.
Figure 2B:
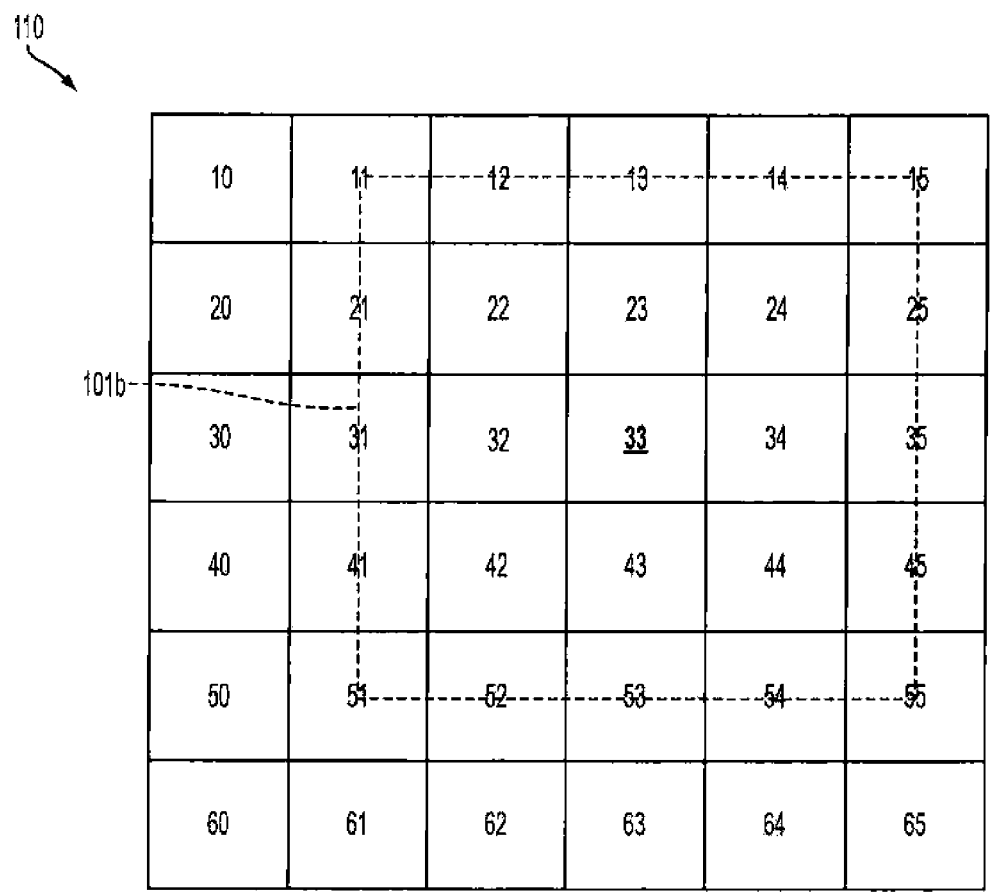
FIG. 2B depicts a correction kernel for a defective green pixel of a pixel array in accordance with the invention.

FIGS. 2A and 2B illustrate parts of pixel arrays 100, 110, respectively, each having a respective pixel under test ("PUT"), i.e., pixels 32, 33, that are to undergo a defect location and correction method in accordance with the invention. The pixel arrays 100, 110 may have one or more defective pixels, which also may be part of a cluster defect. In pixel array 100, the PUT 32 represents either a red or a blue pixel. In pixel array 110, the PUT 33 represents a green pixel.

In the illustrated examples, it is assumed that the pixel arrays 100, 110 are associated with a Bayer pattern color filter array (FIG. 1); however, the invention may also be used with other color filter patterns. The color filters 20 transmit incoming light of a particular wavelength range onto the underlying pixels 30. In the Bayer pattern, every other pixel array row consists of alternating red (R) and green (G) colored pixels, while the other rows consist of alternating green (G) and blue (B) color pixels.

To identify and correct defective pixels, the present invention utilizes luminance pixel values obtained from neighboring pixels of the same color plane with respect to the pixel under test. These neighbors are collectively referred to herein as a defect correction kernel. For example, with reference to FIGS. 2A and 2B, for PUTs 32 and 33, the respective correction kernels are 101a and 101b. A total of eight neighbor pixels are included in each correction kernel 101a, 101b along with the PUT 32, 33. It should be noted, that the illustrated correction kernels 101a, 101b are exemplary, and that other correction kernels may be chosen for pixel arrays using color filter patterns other than the Bayer pattern. In addition, a correction kernel could encompass more or less than eight neighboring pixels if desired.

In FIGS. 2A and 2B, the exemplary correction kernels 101a, 101b are outlined with a dotted line. For kernel 101a there are eight pixels 10, 12, 14, 30, 34, 54, 52, and 50 having the same color as the PUT 32. Although it appears that correction kernel 101a contains sixteen pixels, it should be noted that half of the pixels are green pixels, whose signals would not be used for correction of a red/blue PUT 32. That is, only pixels of the same color as the PUT are used in a correction kernel. The actual pixels that make up kernel 101a are shown in greater detail in FIG. 3. For kernel 101b there are illustratively eight pixels 11, 13, 15, 31, 35, 51, 53 and 55 having the same color green as the PUT 33.

Figure 3:
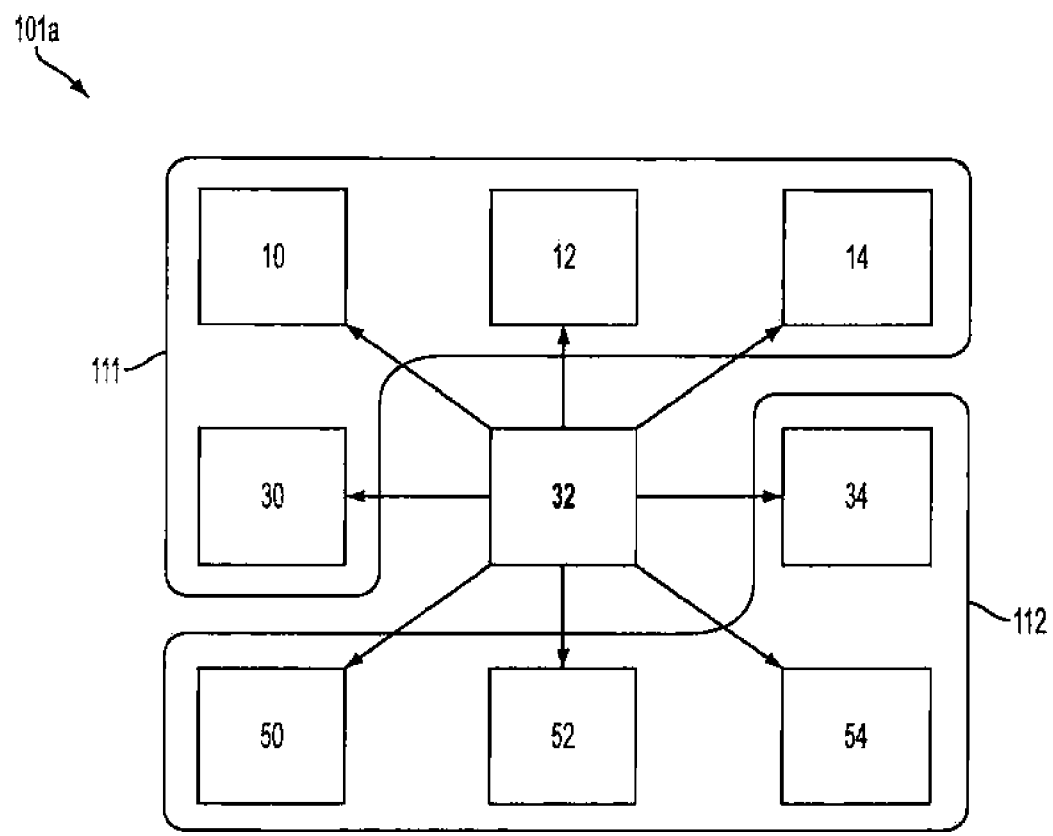
FIG. 3 depicts the correction kernel of FIG. 2A in more detail.

With reference to FIG. 3, and for purposes of the remaining discussion, each of the pixels of kernel 101a is given a pixel identifier number $P_n$, where n is a number between one and eight, for purposes of simplifying the discussion herein. The pixel under test 32 is identified solely as PUT.

Figure 4:
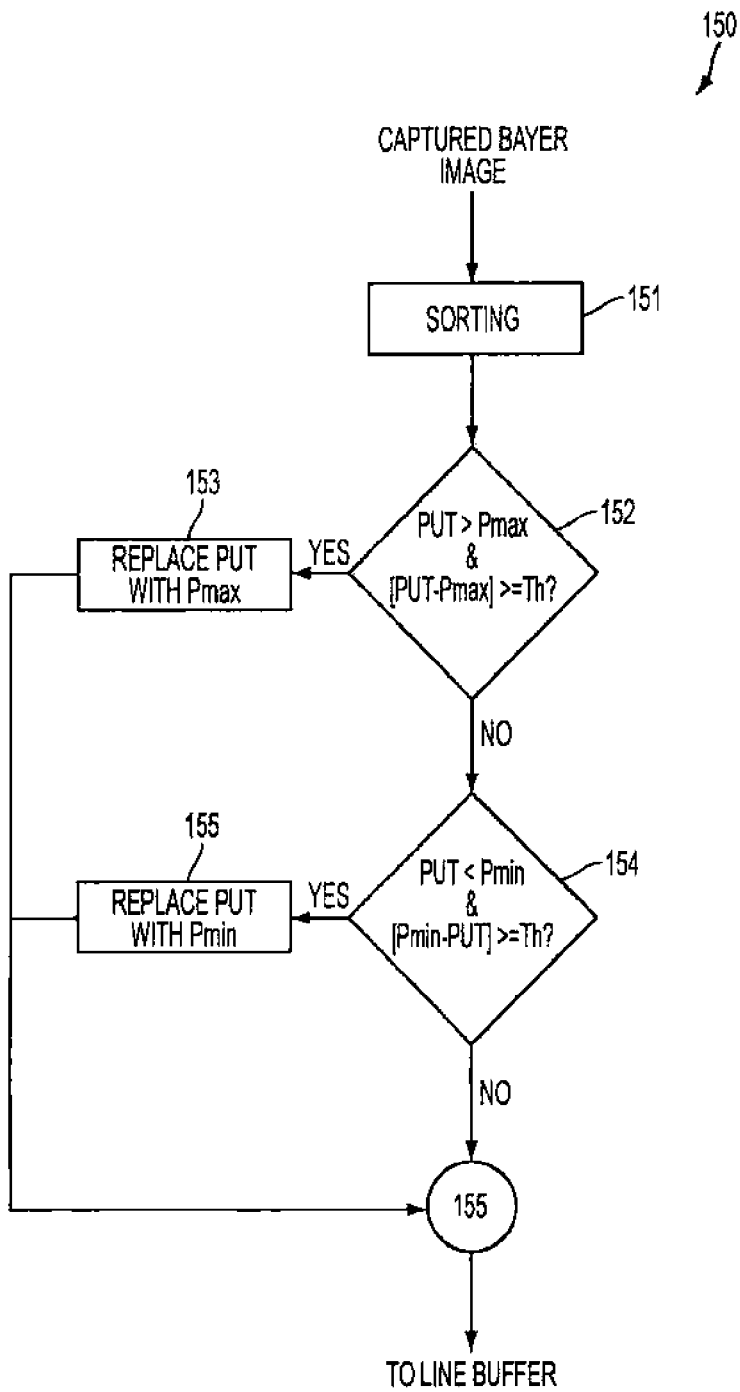
FIG. 4 shows a flowchart of an exemplary method for correcting a single pixel defect.

With reference to FIG. 4, a method 150 of performing defective pixel identification and correction is now described, with reference to the correction kernel 101a and corresponding pixel identifiers $P_1 \ldots P_8$ illustrated in FIG. 3. This method 150, however, is only suitable for single pixel defects because it assumes that each neighboring pixel of the PUT is non-defective.

In a first step 151 of the method 150, an image is captured as pixels output signals representing the imaged light, and processing circuitry sorts digitized versions of the output signals. For each PUT, the neighboring eight, same-color pixel values are sorted in either ascending or descending order for further processing. As such, the highest value is designated $P_{max}$, and the lowest value is designated $P_{min}$.

Next, at step 152, the value for the PUT is compared to the maximum value $P_{max}$ of the eight neighboring pixels. If the value for the PUT is greater than $P_{max}$ and if the difference between the two values (PUT–$P_{max}$) is greater than or equal to some pre-determined threshold value Th, then the method 150 proceeds to step 153. If either of the step 152 conditions are not met, however, the method 150 proceeds to step 154.

At step 153, the value for the PUT is replaced by $P_{max}$. Once this act is completed, the method proceeds to step 155, and the replaced pixel value for PUT is output onto a line buffer.

If, on the other hand, the step 152 conditions are not met, at step 154, the minimum pixel value $P_{min}$ of the eight neighboring pixels is compared to the value for the PUT. If the PUT value is less than $P_{min}$ and if the difference between the two values is greater than or equal to a pre-determined threshold Th, then the method 150 proceeds to step 155. At step 155, the value for the PUT is replaced by substituting the value PUT with $P_{min}$. Once this replacement is completed, the method 150 proceeds to step 155, and the replaced pixel value for PUT is output onto a line buffer.

If, on the other hand, the step 154 conditions were not met, the PUT is not considered defective, and the method proceeds to step 155. At step 155, the value for the PUT is accepted as non-defective, and it is output to a line buffer.

Figure 5:
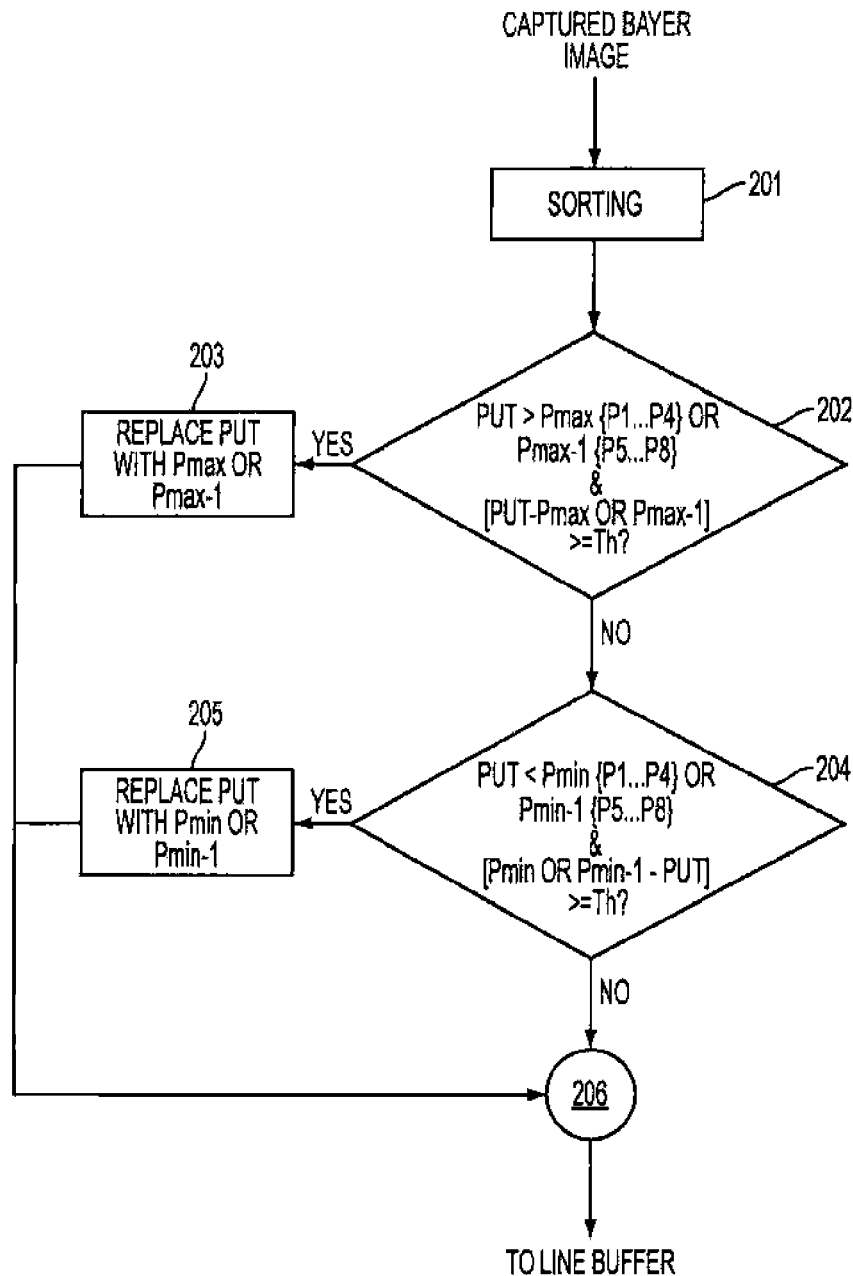
FIG. 5 shows a flowchart of a method for correcting one or more pixel defects in accordance with an exemplary embodiment of the invention.

The method 150 has the drawback of only being suitable for single pixel defects. An alternative method 200 in accordance with the present invention is now described with reference to FIG. 5 using the same pixel identifiers as above with reference to FIG. 3. The method 200 can be used for identifying and correcting pixels that are part of a defect cluster, as well as for individual defective pixels.

Because pixel kernels propagate the image sensor processor in a raster scan fashion, for every PUT 32 (FIG. 3) one half of its neighboring pixels in the kernel 101a are deemed corrected. As such, although a kernel 101a is described and illustrated herein as having eight neighboring pixels, and one PUT, the method 200 operates based on a premise that four pixels in the kernel 101a are corrected. Further, the method 200 presumes that the remaining four pixels may contain a pixel defect. As shown in FIG. 3, the correction kernel 101a contains a first pixel group 111 that has four pixels 10, 12, 14, 30 that have been corrected in accordance with the method 200. A second pixel group 112 has four pixels 34, 50, 52, 54, that have not been corrected, and therefore, are assumed to have at least one defect. It should also be understood that correction kernels having more or less than eight pixels are also within the scope of the invention.

At a first step 201 of method 200, the luminance values for each of the pixels of the kernel 101a being considered are determined and sorted, preferably in ascending order. As such, $P_{max}$ represents the highest pixel value in a group, and $P_{max-1}$ represents the second highest pixel value. Correspondingly, $P_{min}$ represents the lowest pixel value and $P_{min-1}$ represents the second lowest pixel value.

As stated above, a kernel has eight neighbor pixels for a PUT will have two pixel groups 111, 112. The first pixel group 111 has four pixels 10, 12, 14, 30 having four associated pixel values P1, P2, P3, P4. The second pixel group 112 has the remaining four pixels 34, 50, 52, 54, each having associated values P5, P6, P7, P8.

At step 202, the value of the signal for the PUT is compared with the maximum values for the other pixels in the correction kernel 101a. If the maximum value $P_{max}$ is from the first pixel group 111, the value for the PUT will be compared to the maximum value $P_{max}$. If, however, the maximum value $P_{max}$ is from a pixel in the second pixel group 112, the method 200 assumes that the maximum value is also a defective value; accordingly, the PUT value is compared to the second highest value $P_{max-1}$. If the PUT value is greater than either the highest pixel value $P_{max}$ from the first pixel group 111 or the second highest pixel value $P_{max-1}$, and if the difference is greater than a first threshold value $Th_1$, the method 200 proceeds to step 203. At step 203, the value for the PUT pixel, in this case pixel 32, is replaced with either $P_{max}$, or $P_{max-1}$ depending on which value was used for the comparison at step 202. At this stage, the method 200 proceeds to step 206, where the replaced pixel value for PUT is output to a line buffer.

If at step 202, on the other hand, the value for PUT is not greater than either the $P_{max}$ from the first pixel group 111 or the second highest pixel value $P_{max-1}$ or if the difference between the values is less than the first pre-determined threshold value $Th_1$, the method 200 proceeds to step 204. At step 204, the PUT value is compared to the minimum pixel values in the pixel groups 111, 112. The pixel PUT value is compared to the minimum pixel value $P_{min}$ if the minimum value is from a pixel in the first pixel group 111 of the kernel 101a. If the minimum value $P_{min}$ is from a pixel in the second group, however, the PUT value will be compared to the second minimum pixel value $P_{min-1}$ from the second pixel group 112.

If the pixel PUT value is less than either $P_{min}$ from the first pixel group 111 or $P_{min-1}$, and if the difference is greater than a second pre-determined threshold value $Th_2$, the method 200 proceeds to step 205. It should be noted that the thresholds $Th_1$, $Th_2$ used in steps 202 and 204 may or may not have the same value. These thresholds are programmable thresholds that can be set depending on the necessary image quality for the application executing the exemplary method 200.

At step 205, the PUT value is replaced with $P_{min}$ or $P_{min-1}$ depending on which value was used for the comparison at step 204. At this point, the method 200 proceeds to step 206 to output the replaced value as the value from the pixel under test 32. If on the other hand, at step 204, it is determined that the PUT value is not less than either $P_{min}$ or $P_{min-1}$ by the second threshold $Th_2$, the method proceeds to step 206 to output the PUT value as the pixel value for pixel 32.

The exemplary method 200 has several advantages over conventional pixel correction methods. First, as noted above, the method 200 can correct single or cluster pixel defects. Secondly, the method 200 should not degrade image quality noticeably. Image quality becomes a problem with some correction methods as a mere substitution of a neighbor pixel value can result in increased overly-bright or overly-dark spots in the case of pixel defects, or can otherwise result in a reproduced image with blurriness. Third, the method 200 can achieve the first two advantages without necessitating an architectural change, as the method 200 can be done simply within the same imaging device 300 (FIG. 6) and using the same image processor 280 that performs single pixel correction. In fact, in a preferred embodiment, the image processor 280 can run both a single pixel defect correction method and the method 200.

Figure 6:
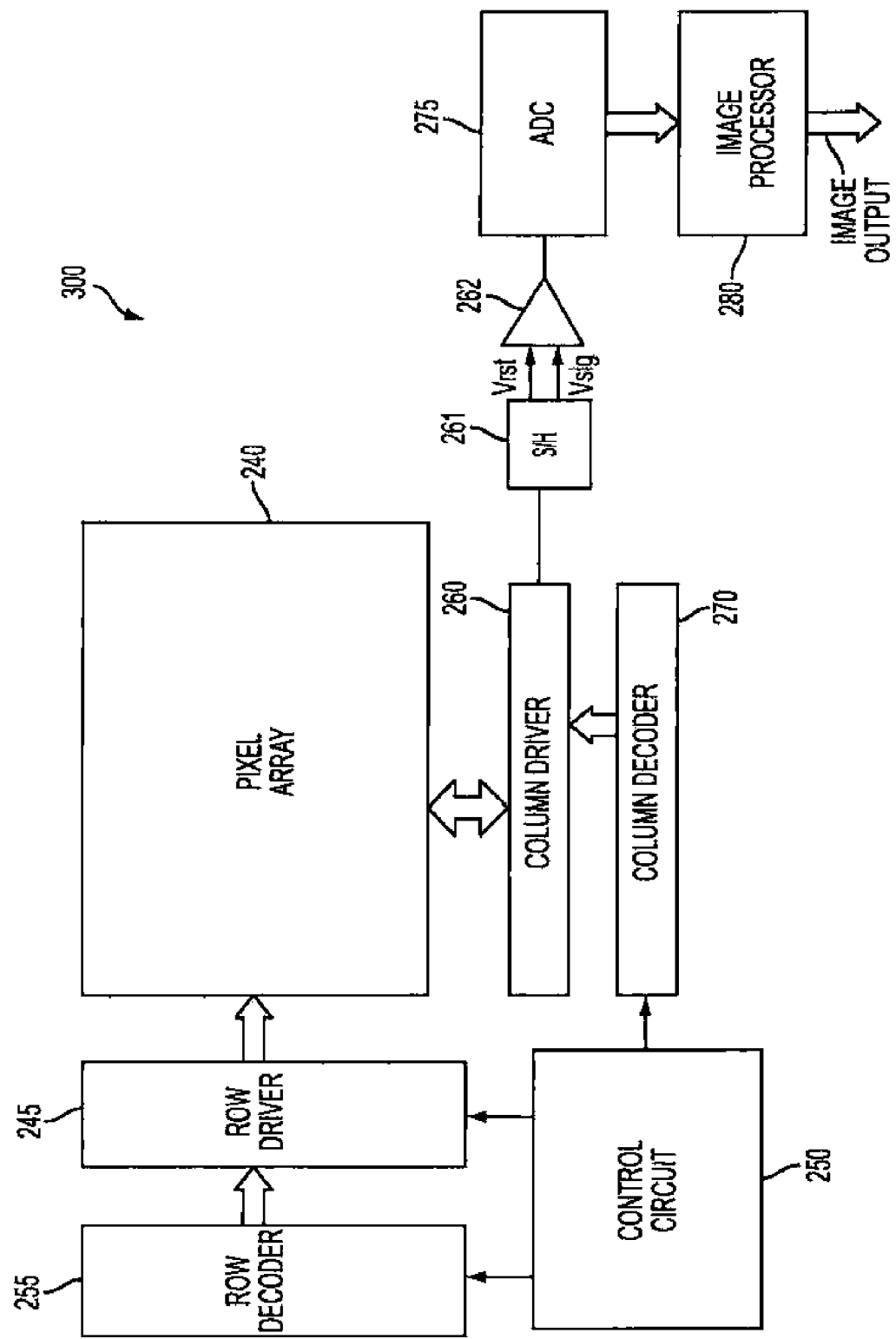
FIG. 6 shows a block diagram of an imager constructed in accordance with an exemplary embodiment of the invention.

FIG. 6 illustrates an exemplary imaging device 300 having a pixel array 240. Row lines of the array 240 are selectively activated by a row driver 245 in response to row address decoder 255. A column driver 260 and column address decoder 270 are also included in the imaging device 300. The imaging device 300 is operated by the timing and control circuit 250, which controls the address decoders 255, 270. The control circuit 250 also controls the row and column driver circuitry 245, 260.

A sample and hold circuit 261 associated with the column driver 260 reads a pixel reset signal Vrst and a pixel image signal Vsig for selected pixels of the array 240. A differential signal (Vrst-Vsig) is produced by differential amplifier 262 for each pixel and is digitized by analog-to-digital converter 275 (ADC). The analog-to-digital converter 275 supplies digitized pixel signals to an integrated circuit that has been constructed to perform the defect correction method 200 of the present invention, possibly in conjunction with other defect correction algorithms. The defect correction algorithm would then output corrected signals to an image processor 280 that outputs a digital image.

Figure 7:
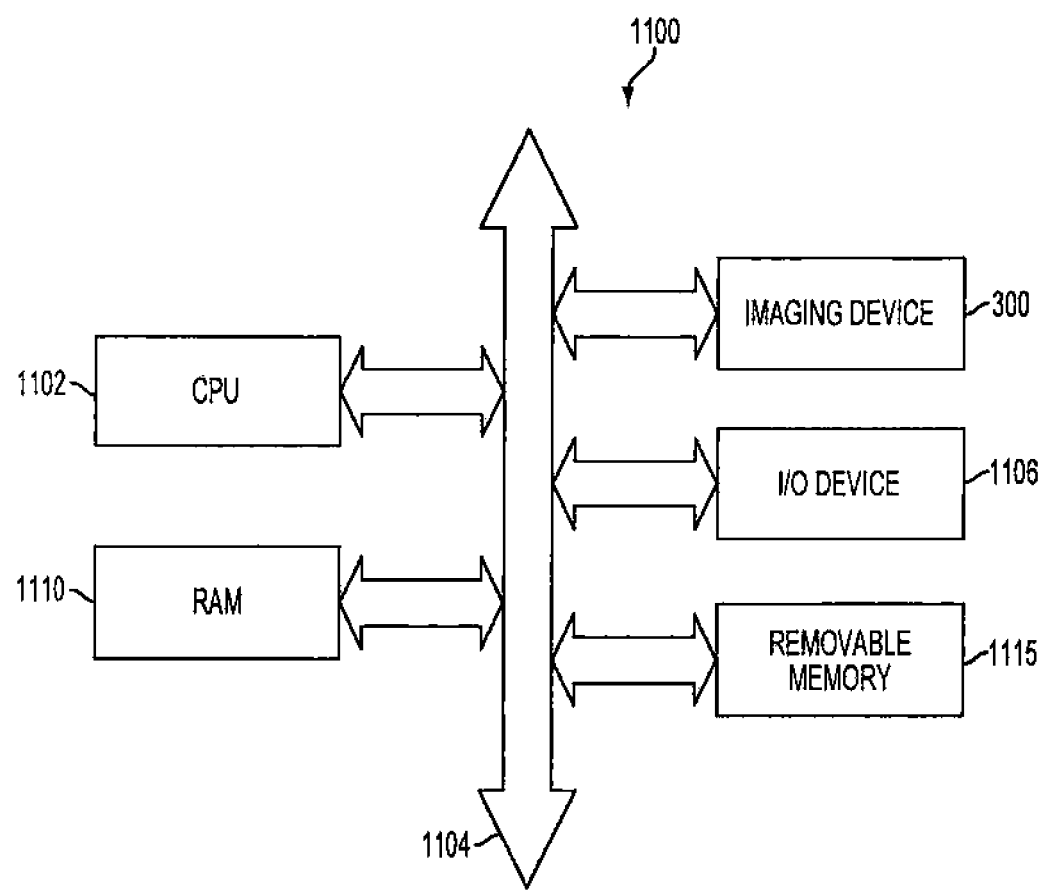
FIG. 7 shows a processor system incorporating at least one imaging device constructed in accordance with an embodiment of the invention.

FIG. 7 shows system 1100, a typical processor system modified to include the imaging device 300 (FIG. 6) of the invention. The system 1100 is exemplary of a system having digital circuits that could include image sensor devices. Without being limiting, such a system could include a computer system, still or video camera system, scanner, machine vision, video phone, and auto focus system, or other imager applications.

System 1100, for example a camera system, generally comprises a central processing unit (CPU) 1102, such as a microprocessor, that communicates with an input/output (I/O) device 1106 over a bus 1104. Imaging device 300 also communicates with the CPU 1102 over the bus 1104. The processor-based system 1100 also includes random access memory (RAM) 1110, and can include removable memory 1115, such as flash memory, which also communicate with the CPU 1102 over the bus 1104. The imaging device 300 may be combined with a processor, such as a CPU, digital signal processor, or microprocessor, with or without memory storage on a single integrated circuit or on a different chip than the processor.

While the invention has been described in detail in connection with exemplary embodiments known at the time, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. For example, the methods can be used with pixels in other patterns than the described Bayer pattern, and the correction kernels would be adjusted accordingly. In addition, the invention is not limited to the type of imager device in which it is used. Thus, the invention is not to be seen as limited by the foregoing description, but is only limited by the scope of the appended claims.

What is claimed as new and desired to be protected by Letters Patent of the United States is:

1. A method of processing a pixel signal from a pixel under test, comprising the acts of:
   determining that the pixel under test is defective, comprising the acts of:
      analyzing first and second sets of neighboring pixels surrounding the pixel under test, said first and second sets each comprising a plurality of said neighboring pixels; and
      determining that a luminance value from the pixel under test is greater or less than a first luminance value from at least one of said first or said second sets of neighboring pixels by a pre-determined threshold amount;
   wherein, if said pixel under test is determined to be defective, replacing the luminance value of the pixel under test with the first luminance value.

2. The method of claim 1, further comprising the act of outputting said luminance value from the pixel under test if said pixel under test is determined to be not defective.

3. The method of claim 1, further comprising the act of determining a luminance value for each pixel in said first and second pixel sets.

4. The method of claim 3, further comprising the act of sorting the determined luminance values in each of said first and second pixel sets.

5. The method of claim 4, wherein the act of determining that said pixel under test is defective comprises comparing said luminance value from said pixel under test with a high luminance value from at least one of said sorted pixel sets.

6. The method of claim 5, further comprising the act of replacing said luminance value from said pixel under test with said high luminance value.

7. The method of claim 5, further comprising the act of comparing said luminance value from said pixel under test with a low luminance value from at least one of said sorted first and second pixel sets.

8. The method of claim 7, further comprising the act of replacing said luminance value from said pixel under test with said low luminance value.

9. The method of claim 1, wherein the act of analyzing the first and second sets of pixels comprises the act of sorting by luminance value a pre-determined number of nearest pixels having the same color channel as the pixel under test.

10. The method of claim 9, wherein the predetermined number is eight.

11. The method of claim 1, wherein the luminance value from the pixel under test is compared to a maximum luminance value from said pixels in said first set.

12. The method of claim 11, wherein if said luminance value from the pixel under test is greater than said maximum luminance value, said method further comprises the act of replacing said luminance value from the pixel under test with said maximum value.

13. The method of claim 1, wherein the luminance value from the pixel under test is compared to a next-to-maximum luminance value from said pixels in said first and second sets.

14. The method of claim 13, wherein if said luminance value from said pixel under test is not greater than said next-to-maximum luminance value, said method further comprises the act of comparing said luminance value from said pixel under test to a minimum luminance value for a pixel from said pixels of said first and second sets.

15. The method of claim 1, wherein said step of determining that said pixel under test is defective comprises determining that said luminance value from the pixel under test is greater than said first luminance value.

16. The method of claim 1, wherein said step of determining that said pixel under test is defective comprises determining that said luminance value from the pixel under test is less than said first luminance value.

17. The method of claim I, wherein said step of determining that said pixel under test is defective comprises:
   determining whether said luminance value from the pixel under test is greater than a highest luminance value from said first and said second sets of neighboring pixels,
   determining whether said luminance value from the pixel under test is less than a lowest luminance value from said first and said second sets of neighboring pixels; and
   if said luminance value is greater than said highest luminance value or lower than said lowest luminance value by a difference exceeding at least one predetermined threshold value, identifying said pixel under test as defective.

18. A method for identifying and correcting defective pixels comprising the acts of:
   selecting a correction kernel for a pixel under test, said correction kernel comprising at least four pixels;
   determining a pixel value P for said pixel under test;
   setting first and second thresholds used for determining if said pixel under test is defective, wherein said first threshold is used in comparing said pixel value P to at least a first pixel value from said correction kernel, and said second threshold is used in comparing said pixel value P to at least a second pixel value from said correction kernel, wherein said first pixel value is greater than said second pixel value; and
   replacing said pixel value P if said pixel value P is greater than said first value by more than said first threshold or replacing said pixel value P if said pixel value P is less than said second value by more than said second threshold.

19. The method of claim 18, wherein said first and second thresholds are the same.

20. The method of claim 18, wherein said first and second thresholds are different.

21. The method of claim 18, wherein said correction kernel comprises at least first and second sets of pixels of the same color channel as said pixel under test.

22. The method of claim 21, wherein said first pixel value is a maximum pixel value from at least one set of said pixels in said correction kernel.

23. The method of claim 22, wherein said second value is a minimum pixel value from at least one set of said pixels in said correction kernel.

24. The method of claim 18, further comprising:
raster scanning pixels of an imaging array,
wherein said method for identifying and correcting defective pixels is applied to said at least four pixels of said correction kernel, during said raster scanning, before said method for identifying and correcting defective pixels is applied to said pixel under test.

25. An imaging device comprising:
a pixel array comprising a plurality of pixels, each pixel generating a pixel value representing an amount of light received thereat; and
a pixel correction circuit for raster scanning said pixel array and correcting at least one pixel under test, wherein the pixel correction circuit: selects first and second sets of pixels from at least two rows of said pixel array, determines if said pixel under test is defective by comparing said pixel value from said pixel under test to pixel values from said pixels of said first and second sets; and, if said pixel under test is defective, substitutes a replacement value for said pixel value of said pixel under test.

26. The imaging device of claim 25, wherein the pixel correction circuit is capable of identifying cluster pixel defects.

27. The imaging device of claim 26, wherein the correction circuit is further capable of identifying single pixel defects.

28. The imaging device of claim 25, wherein the first and second sets each comprise four pixels.

29. The imaging device of claim 25, wherein if said pixel under test is not defective, the pixel correction circuit outputs said pixel value of said pixel under test to a line buffer.

30. The imaging device of claim 25, wherein said first set comprises pixels from a pixel row at a first side of said pixel under test, and said second set comprises pixels from another pixel row at a second side of said pixel under test, said first side opposing said second side.

31. The imaging device of claim 25, wherein said first and second sets each comprise pixels from a pixel row including said pixel under test.

32. A method for correcting defective pixels comprising the acts of:
determining a pixel value PUT of a pixel under test;
sorting pixel values for each of a plurality of neighboring pixels in first and second pixel sets;
if $P_{max}$ is from the first set, determining if $PUT-P_{max}>Th_1$, where $P_{max}$ is the highest pixel value from the neighboring pixels, and wherein $Th_1$ is a first pre-determined threshold value;
if $P_{max}$ is from the second set, determining if $PUT-P_{max-1}>Th_1$, where $P_{max-1}$ is the second highest pixel value from the neighboring pixels; if either $(PUT-P_{max}>Th_1)$ or $(PUT-P_{max-1}>Th_1)$, replacing said pixel under test pixel value.

33. The method of claim 32, wherein the act of replacing said pixel value PUT of said pixel under test comprises replacing PUT with one of $P_{max}$ or $P_{max-1}$.

34. The method of claim 32 further comprising the acts of:
determining if $P_{min}-PUT>Th_2$, where $P_{min}$ is the lowest pixel value from the neighboring pixels, and $Th_2$ is a second pre-determined threshold value if $P_{min}$ is from the pixels in the first pixel set; and
determining if $P_{min-1}-PUT>Th_2$, where $P_{min}$ is the second lowest pixel value from the neighboring pixels, if $P_{min}$ is from the pixels in the second pixel set.

35. The method of claim 34, further comprising the act of replacing PUT with one of $P_{min-1}$ and $P_{min}$.

36. The method of claim 32, wherein said first set comprises said neighboring pixels that have been assessed by said method for correcting defective pixels, said second set comprises said neighboring pixels that have not been assessed by said method for correcting defective pixels.

37. A processing system comprising:
a processor; and
an imaging device connected to the processor and comprising:
a pixel array comprising a plurality of pixels, each pixel outputting a signal representing an amount of light received thereat; and
a pixel correction circuit for correcting a pixel value of a pixel under test, wherein the pixel correction circuit: selects first and second set of pixels surrounding all sides of said pixel under test; determines if said pixel under test is defective by comparing said pixel value from said pixel under test to pixel values from at least two of said pixels of said first and second sets; and if said pixel under test is defective, substitutes a replacement value for said pixel value of said pixel under test.

38. The processing system of claim 37, wherein the imaging device is a CMOS imager.

39. The processing system of claim 37, wherein the imaging device is a CCD imager.

40. The processing system of claim 37, wherein the pixel value of a given pixel is a digitized representation of the amount of light received by that pixel.

41. The processing system of claim 37, wherein the pixel correction circuit first compares said pixel value of said pixel under test to at least one high pixel value from said first and second sets of pixels and if said pixel value of said pixel under test is lower than said high pixel value, compares said pixel value of said pixel under test to at least one low pixel value from said first and second set of pixels.

42. The processing system of claim 41, wherein the pixel correction circuit determines whether a difference between said pixel value of said pixel under test and either of said high pixel value or low pixel value is greater than a pre-determined threshold.

43. The processing system of claim 42, wherein the act of considering if said pixel under test is defective comprises determining said difference between either said pixel value of said pixel under test and said high pixel value or between said low value and said value is greater than said pre-determined threshold.

44. A method of processing a pixel signal from a pixel under test, comprising the acts of:
determining that the pixel under test is defective, comprising the acts of:
analyzing first and second sets of neighboring pixels surrounding a pixel under test, said first and second sets each comprising a plurality of said neighboring pixels; and
determining that a luminance value from the pixel under test is greater or less than a first luminance value from at least one of said first or said second sets of neighboring pixels by a pre-determined threshold amount;
wherein said first luminance value is a next-to-maximum luminance value from said pixels in said first and second sets, and wherein, if said pixel under test is determined to be defective, replacing the luminance value of the pixel under test with the first luminance value.

45. The method of claim 44, wherein if said luminance value from said pixel under test is not greater than said next-to-maximum value, said method further comprises the act of comparing said luminance value said pixel under test to a minimum luminance value for a pixel from said pixels of said first and second sets.

* * * * *